:::: {.columns}
::: {.column}
(12) United States Patent
Azad et al.

(54) RESTORING MEMORY DATA INTEGRITY

(71) Applicant: XILINX, INC., San Jose, CA (US)

(72) Inventors: Sarosh I. Azad, Fremont, CA (US);
Wern-Yan Koe, Cupertino, CA (US);
Amitava Majumdar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 24 days.

(21) Appl. No.: 17/178,207

(22) Filed: Feb. 17, 2021

(51) Int. Cl.
    *G06F 11/10*    (2006.01)
    *G06F 12/06*    (2006.01)

(52) U.S. Cl.
    CPC .......... *G06F 11/1068* (2013.01); *G06F 12/06* (2013.01); *G06F 2212/1032* (2013.01)

(58) Field of Classification Search
    CPC ................. G06F 11/1068; G06F 12/06; G06F 2212/1032
    USPC ....... 714/764, 763, 768, 769, 773, 774, 799, 714/718; 365/200, 201, 185.09
    See application file for complete search history.

(56) References Cited

U.S. PATENT DOCUMENTS 4,785,359 A * 11/1988 Hickok .................. H04N 9/893
    386/314
7,051,264 B2 * 5/2006 Leung ................. G06F 11/1048
    714/E11.049
:::

::: {.column}
(10) Patent No.: US 11,429,481 B1
(45) Date of Patent: Aug. 30, 2022

9,612,908 B2 * 4/2017 Kim ..................... G06F 11/1402
2003/0012063 A1 * 1/2003 Chien .................... G11C 11/406
    365/200
2003/0093744 A1 * 5/2003 Leung ................. G06F 11/1048
    714/E11.049

OTHER PUBLICATIONS

Wu et al., Idle Cycles Based Concurrent Error Detection of RC6 Encryption, 2001, IEEE, pp. 1-6. (Year: 2001).*

* cited by examiner

*Primary Examiner* — John J Tabone, Jr.
(74) *Attorney, Agent, or Firm* — Patterson + Sheridan, LLP (57) ABSTRACT

Embodiments herein describe a hardware based scrubbing scheme where correction logic is integrated with memory elements such that scrubbing is performed by hardware. The correction logic reads the data words stored in the memory element during idle cycles. If a correctable error is detected, the correction logic can then use a subsequent idle cycle to perform a write to correct the error (i.e., replace the corrupted data stored in the memory element with corrected data). By using built-in or integrated correction logic, the embodiments herein do not add extra work for the processor, or can work with applications that do not include a processor. Further, because the correction logic scrubs the memory during idle cycles, correcting bit errors does not have a negative impact on the performance of the memory element. Memory scrubbing can delay the degradation of data error, extending the integrity of the data in the memory.

20 Claims, 4 Drawing Sheets
:::
::::

RESTORING MEMORY DATA INTEGRITY

TECHNICAL FIELD

Examples of the present disclosure generally relate to restoring or correcting bit errors in memory.

BACKGROUND

Random access memories (RAM) are prone to single bit upsets (SBU) due to bombardment of cosmic particles. This effect is more pronounced in space but is still observable in terrestrial applications. Industrial and automotive functional safety standards (e.g., IEC61508 and ISO26262) require that silicon devices implement safety mechanisms to ensure that accumulation of errors in RAM do not lead to a violation of the safety goal of an application, which can lead to harm to the vehicle or a person in the vehicle.

In some error correction codes (ECC) single and double bit errors are correctable, meaning that ECC syndrome bits can be used to recover the original data. Such correctable errors do not bring the application down or move the application into an unsafe state—e.g., stop the operation of an automobile. That is, the system can correct these errors (when detected) without having to change the state of the system. However, other errors are uncorrectable such as double bit errors (for some ECC schemes), triple bit errors, etc. If a system does not catch or identify a correctable error in time, they can degrade into an uncorrectable error. When uncorrectable errors are detected in RAM, they require that the application deliberately take the system to a safe state—e.g., safely bring a vehicle to stop or disengage an autopilot.

Thus, it is desired that a memory system detects and corrects correctable errors (e.g., SBU or double bit upsets) before these errors degrade into uncorrectable errors. For example, cosmic rays may cause a first bit in a data word stored in RAM to flip, which is a correctable error. However, if cosmic rays cause a second bit in the same data word to flip before the first bit is corrected, this can change the error from a correctable error to an uncorrectable error in an ECC scheme that can only correct single-bit error. Currently, memory systems rely on software or firmware solutions to detect and correct bit errors. That is, current designs employ a software scrubbing technique where a processor is responsible for reading contents of RAMs, detecting correctable errors, and correcting them in the RAMs. However, this scrubbing technique takes away cycles from a processor core that would otherwise be used to execute the actual application. Further, this technique uses communication bandwidth that could have otherwise been used for the actual application. Moreover, this technique requires that all RAMS be accessible by a processor core, which is not practical for all memory storage space.

SUMMARY

One embodiment describes an integrated circuit that includes a memory element configured to store data at a plurality of addressable memory locations and correction logic. The correction logic is configured to detect a first idle cycle in the memory element, perform a read operation at a first memory address in the memory element during the first idle cycle, detect a correctable error at the first memory address, detect a second idle cycle in the memory element, and perform a write operation at the first memory address during the second idle cycle to correct the correctable error using corrected data.

Another embodiment described herein is a circuit that includes a memory element configured to store data at a plurality of addressable memory locations and correction logic. The correction logic is configured to detect a first idle cycle in the memory element, perform a read operation at a first memory address in the memory element during the first idle cycle, detect a correctable error at the first memory address, detect a second idle cycle in the memory element, and perform a write operation at the first memory address during the second idle cycle to correct the correctable error using corrected data.

Another embodiment described herein is a method that includes detecting a first idle cycle in a memory element comprising a plurality of addressable memory locations, performing a read operation at a first memory address in the memory element during the first idle cycle, detecting a correctable error at the first memory address, detecting a second idle cycle in the memory element, and performing a write operation at the first memory address during the second idle cycle to correct the correctable error using corrected data.

BRIEF DESCRIPTION OF DRAWINGS

So that the manner in which the above recited features can be understood in detail, amore particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Rather than relying on a software/firmware solution to memory scrubbing, embodiments herein describe a hardware based scrubbing scheme where correction logic is integrated with RAM arrays such that scrubbing is performed by hardware. Some non-limiting advantages of the embodiments herein are that memory scrubbing can be performed without intervention by (or use of) a processor, without generating activity on an interconnect between the processor and the RAM, and without reducing the performance of the RAM. To do so, Each RAM array includes correction logic that reads the data words stored in the RAM during idle cycles. The correction logic can sample the read and write enable signals during a beginning of a clock cycle (e.g., a rising edge of the clock), and if these signals are deactivated, can perform its own read into the RAM. If an ECC check circuit detects a correctable error, the correction logic can then use a subsequent idle clock cycle to perform a write to correct the error (i.e., replace the corrupt data word with corrected data). By using built-in or integrated correction logic, the embodiments herein do not add extra work for the processor, and can work with implementations that do not include a processor. Further, because the correction logic can scrub the memory during idle cycles, correcting bit errors does not have a negative impact on the performance of the RAM.

Figure 1:
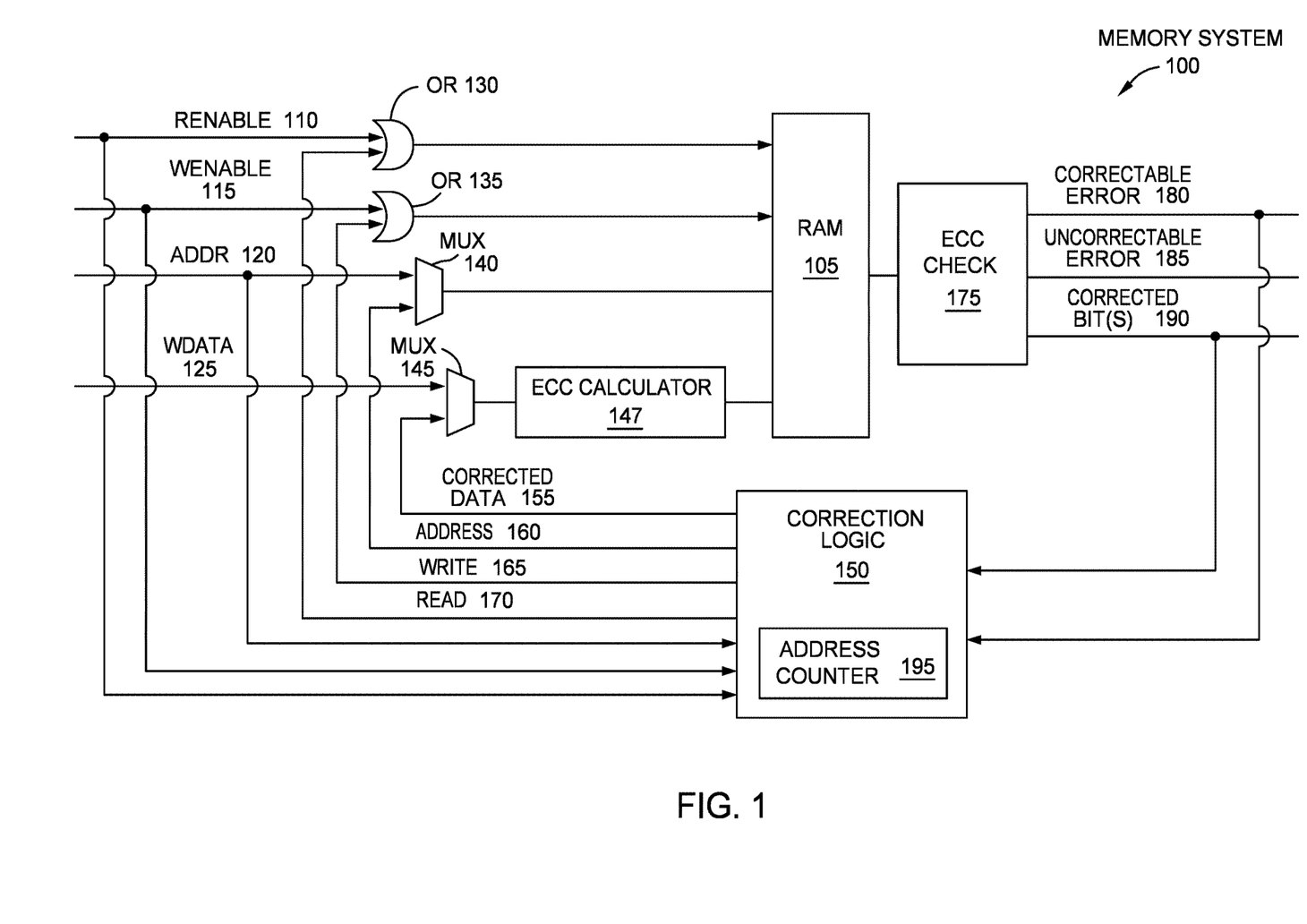
FIG. 1 is a memory system, according to an example.

FIG. 1 is a memory system 100, according to an example. The memory system 100 includes a RAM 105 that can include any number of memory blocks. While RAM 105 is specifically disclosed, the scrubbing techniques described herein can be used with various types of memory elements, whether volatile or non-volatile such as flash memory, solid state, DRAM, SRAM, etc. The memory blocks in the RAM 105 store data provided by an application (not shown) which can then retrieve the data, modify it, and store it back into the RAM 105. To detect and correct bit errors, the RAM 105 can store ECC data. For example, each addressable memory location in the RAM 105 may store one or more ECC bits. To generate the ECC bits, write data (WDATA) 125 received from the processor passes through a multiplexer (MUX) 145 and arrives at an ECC calculator 147, which calculates one or more ECC bits for the data before storing the data, along with the ECC bits, into the RAM 105. For example, the RAM 105 may include an array of memory blocks, some of which store the WDATA 125 generated by the application or processor while others store the ECC bits generated by the ECC calculator 147.

To detect errors in the data stored in the RAM 105, the system 100 includes an ECC check 175 which includes circuitry that can evaluate the data and ECC bits stored at a selected memory address and determine whether there is no error, a correctable error, or an uncorrectable error. That is, the system 100 can perform a read operation where the data stored at a particular memory address is read out from the RAM 105 and sent to the ECC check 175 which then determines, using the ECC bits, whether one or more of the data bits in the data have been corrupted.

As shown, the ECC check 175 has three outputs: a correctable error signal 180, an uncorrectable error signal 185, and corrected bit(s) 190. If the detected error is a correctable error, the ECC check 175 can provide the corrected bits 190 for correcting that error. However, if the detected error is an uncorrectable error, then it does not output corrected bits 190. Instead, this type of error may be monitored by software (e.g., software or firmware executed by the processor). In one embodiment, the memory system 100 corrects correctable errors but leaves the handling of uncorrectable errors to software and the processor. The embodiments herein are not limited to any type of scheme for handling uncorrectable errors. Put differently, the embodiments herein can be implemented into various applications and systems that may handle uncorrectable errors in different ways such as performing a shutdown, sending an interrupt to the processor, changing to a safe state, etc.

To perform a read operation in the RAM 105, a requesting entity (e.g., a processor or memory controller) can change a read enable (RENABLE) signal 110 to a high state (e.g., a logical 1) while concurrently providing an address of the data the request entity wants to read from the RAM 105 using an address (ADDR) signal 120. The RAM 105 then retrieves the data at the address and outputs it to the ECC check 175. The data is then returned to the requesting entity.

To perform a write operation, the requesting entity changes a write enable (WENABLE) signal 115 to a high state (and the RENABLE signal 110 is in a low state) while concurrently providing a write address for the data using the ADDR signal 120. The data to be written to that address is provided as the WDATA signal 125 to the RAM 105. The RAM 105 then stores the data provided in the WDATA signal 125 to the address provided on the ADDR signal 120 (also with the ECC data generated by the ECC calculator 147).

To perform memory scrubbing to detect errors, the correction logic 150 initiates the read and write operations, in contrast to a "normal" read or write operation being initiated by a requesting entity such as a processor or memory controller. In one embodiment, the correction logic 150 initiates a read operation when detecting an idle cycle. As shown, the correction logic 150, which can include circuitry forming a state machine, receives the RENABLE signal 110 and WENABLE signal 115 as inputs. The correction logic 150 has circuitry that determines whether either of these signals is in a HIGH state. If so, this means a requesting entity is currently performing a read or write operation, and thus, the cycle is not idle. However, if both the RENABLE signal 110 and WENABLE signal 115 are in a low (e.g., inactive) state such as a logical 0, this means no requesting entity is currently using the RAM 105. Thus, at the beginning of each clock cycle (e.g., a rising clock edge), the correction logic 150 can monitor the RENABLE signal 110 and WENABLE signal 115 to determine if the clock cycle is an idle cycle.

When an idle cycle is detected, the correction logic 150 uses a current value in an address counter 195 to perform a read into the RAM 105. The correction logic 150 activates a READ signal 170, which is an input into an OR gate 130. The output of the OR gate 130 is high if either the RENABLE signal 110 or the READ signal 170 is in the high state. Concurrently, the correction logic 150 can output an ADDRESS signal 160 that has the current value of the address counter 195. The ADDRESS signal 160 is an input to a MUX 140 along with the ADDR signal 120. The correction logic 150 can control a selection signal (not shown) for the MUX 140. During an idle cycle, the correction logic 150 can change the selection signal so that the MUX 140 permits the ADDRESS signal 160 to pass to the RAM 105, otherwise, the correction logic 150 controls the selection signal so that the ADDR signal 120 is received by the RAM 105—i.e., ensures the RAM 105 instead receives the address provided by the requesting entity.

The RAM 105 performs the read operation using the address provided by the correction logic 150 and outputs the corresponding data and ECC bits stored at that address to the ECC check 175. As shown, two outputs of the ECC check 175 serve as inputs to the correction logic 150: the correctable error signal 180 and the corrected bits 190. Thus, when the ECC check 175 detects a correctable error in the read out data, it changes the state of the correctable error signal 180 and provides the bits 190 for correcting the error. By monitoring the correctable error signal 180, the correction logic 150 can know there was an error in the data.

In one embodiment, the correction logic 150 identifies an idle cycle, provides the address for a read operation to the RAM 105, the RAM 105 can output the corresponding data to the ECC check 175, and the ECC check 175 can set its outputs all in one clock cycle (e.g., between two consecutive rising edges or two consecutive falling edges of the clock). However, in other embodiments, the memory system 100 may use multiple cycles to perform these functions. For example, during a first clock cycle, the correction logic 150 transmits the address to the RAM 105 and the RAM 105 outputs corresponding read data to the ECC check. During the next clock cycle, the ECC check 175 determines whether there is a correctable or uncorrectable error in the received data and generates its output signals. In this example, the correction logic 150 waits two clock cycles before it knows if the data was corrupted. Thus, the embodiments herein can operate in memory systems that are pipelined where there are buffers between the RAM 105 and other elements, such as the ECC calculator 147 and the ECC check 175.

To correct a correctable error, the correction logic 150 generates corrected data 155 to be stored into the RAM 105 using a write operation. Again, the correction logic 150 may perform the write operation during an idle cycle so it does not disrupt normal operation of the RAM 105. There are several different techniques for waiting before performing the write operation, which are described in more detail in FIGS. 2, 3, and 4.

After identifying another idle cycle, the correction logic 150 transmits the corrected data 155 to the MUX 145. Although not shown in FIG. 1, the correction logic 150 can control the selection signal for the mux 145 to ensure that the mux 145 outputs the corrected data 155 to the RAM 105. Put differently, when there is an idle cycle (or when the correction logic 150 is performing a write operation), the correction logic 150 can control the selection signal so that the mux 145 passes the corrected data 155 to the RAM 105. Otherwise, the correction logic 150 controls the mux 145 so that it passes the WDATA 125 to the RAM 105. Thus, if the requesting entity is performing a write operation, the WDATA 125 will reach the RAM 105.

Concurrently with transmitting the corrected data 155, the correction logic 150 also transmits an address where the corrected data 155 is to be written using the ADDRESS signal 160, which is the same address used to perform the read operation that detected the correctable error. Like when doing a read operation, the correction logic 150 controls the mux 140 so that the ADDRESS signal 160 reaches the RAM 105. The corrected data 155 is first received by the ECC calculator 147 which calculates the ECC bits for this data before storing the corrected data 155 and the ECC bits in the RAM 105 at the address specified in the ADDRESS signal 160.

Further, the correction logic 150 causes the WRITE signal 165 to be in a high state (while concurrently ensuring the READ signal 170 is in a low state). Thus, the output of the OR gate 135 is a high state, thereby indicating to the RAM 105 that a write should be performed using the corrected data 155 and the address indicated by the ADDRESS signal 160.

Once the data is corrected, the correction logic 150 can increment the address counter 195 so that when the next idle cycle is detected, the logic 150 performs a read at the new value in the address counter 195 to determine whether that location in the RAM 105 has a correctable error. In this manner, the correction logic 150 can use idle cycles to detect and correct correctable errors. Hopefully, as the correction logic 150 continues to operate, it will detect errors in the RAM 105 before those errors turn into uncorrectable errors. Because the correction logic 150 can execute continuously, a hardware solution such as shown in FIG. 1 may be better at scrubbing the RAM 105 than a software solution that relies on a processor. That is, because a software solution relies on the processor to scrub the memory at set intervals, the longer the intervals the greater the likelihood that a correctable error turns into an uncorrectable error. While shortening the interval reduces this likelihood, it also means the processor performs memory scrubbing more frequently which takes away processing time for the application. However, the embodiments in FIG. 1 have dedicated hardware from scrubbing the memory which means the processor does not have to get involved with detecting and correcting correctable errors (although it may get involved when there is an uncorrectable error detected). Further, because the correction logic 150 performs its read and write operations during idle cycles, there is no negative impact on the performance of the RAM 105. Moreover, by having dedicated hardware, the RAMs do not have to be accessible to the processor.

In this manner, the correction logic 150 can use idle cycles to both identify correctable errors in the RAM 105 and correct those errors in a subsequent idle cycle. The correction logic 150 can continue to increment the address counter 195 (when address locations do not have errors or when a correctable error has been fixed) to constantly scrub the RAM 105. That is, the address counter 195 can have a maximum value that corresponds to the size of the RAM 105. When the address counter 195 reaches the highest address of the RAM address, it wraps around to start from the lowest address of the RAM and restarting the counting up. Thus, the address counter 195 can iterate through the entire address space of the RAM 105.

However, it is possible that an application making heavy usage of the RAM 105 may not allow enough unused clock cycles for the scrubbing to progress at a desired rate. To detect such issues, a timer can be implemented in the correction logic 150 that resets every time a scrub cycle is completed. In one example, the timer runs off a slow system clock such as 1 MHz. The timer has a counter that decrements with every tick of the slow clock. If the counter reaches zero, an interrupt is issued notifying software that scrub function is not able to complete in the time it took for the timer to decrement to zero (e.g., 32 microseconds) and software intervention may be needed. Every time the correction logic 150 completes a scrub cycle (meaning the address counter 195 rolls over back to zero), it sets the scrub timer back to its max value, e.g., 31. In various implementations of this invention, the max value may be set higher or lower depending on the nature of the application as well as the size of the RAM 105 being scrubbed. That is, the value of the time can be programmable according to the time allocated to complete a scrub-cycle. For example, in an application where the memory system 100 is used in space, the least amount of time may be allocated for a scrub cycle, while terrestrial applications of the memory system 100 may allocate more time for scrub cycles.

In one embodiment, the memory system 100 is integrated into an integrated circuit (IC). That is, the correction logic 150, the OR gates 130, 135, muxes 140, 145, ECC calculator 147, and ECC check 175 may be integrated into the same IC (e.g., a silicon chip) as the RAM 105. As such, the memory system 100 may be hardware elements. However, in another embodiment, some of the circuitry in FIG. 1 may be disposed on multiple ICs. For example, the RAM 105 and the correction logic 150 may be disposed on different ICs.

While the RAM 105 is illustrated as a single port RAM, the embodiments herein can be used with a multi-port RAM (e.g., a two port RAM) which can perform at least one read and at least one write operation in parallel. This can be accomplished by adding a mux on both the read and write address. That is, while FIG. 1 illustrates a mux 140 for the ADDR signal 120 (which is used when performing reads and writes), a two port RAM has separate address buses for reads and writes. By adding muxes to both of those address buses, the correction logic 150 can perform read and write operations during idle cycles as discussed above. Further, the embodiments are independent of any particular process technologies.

Figure 2:
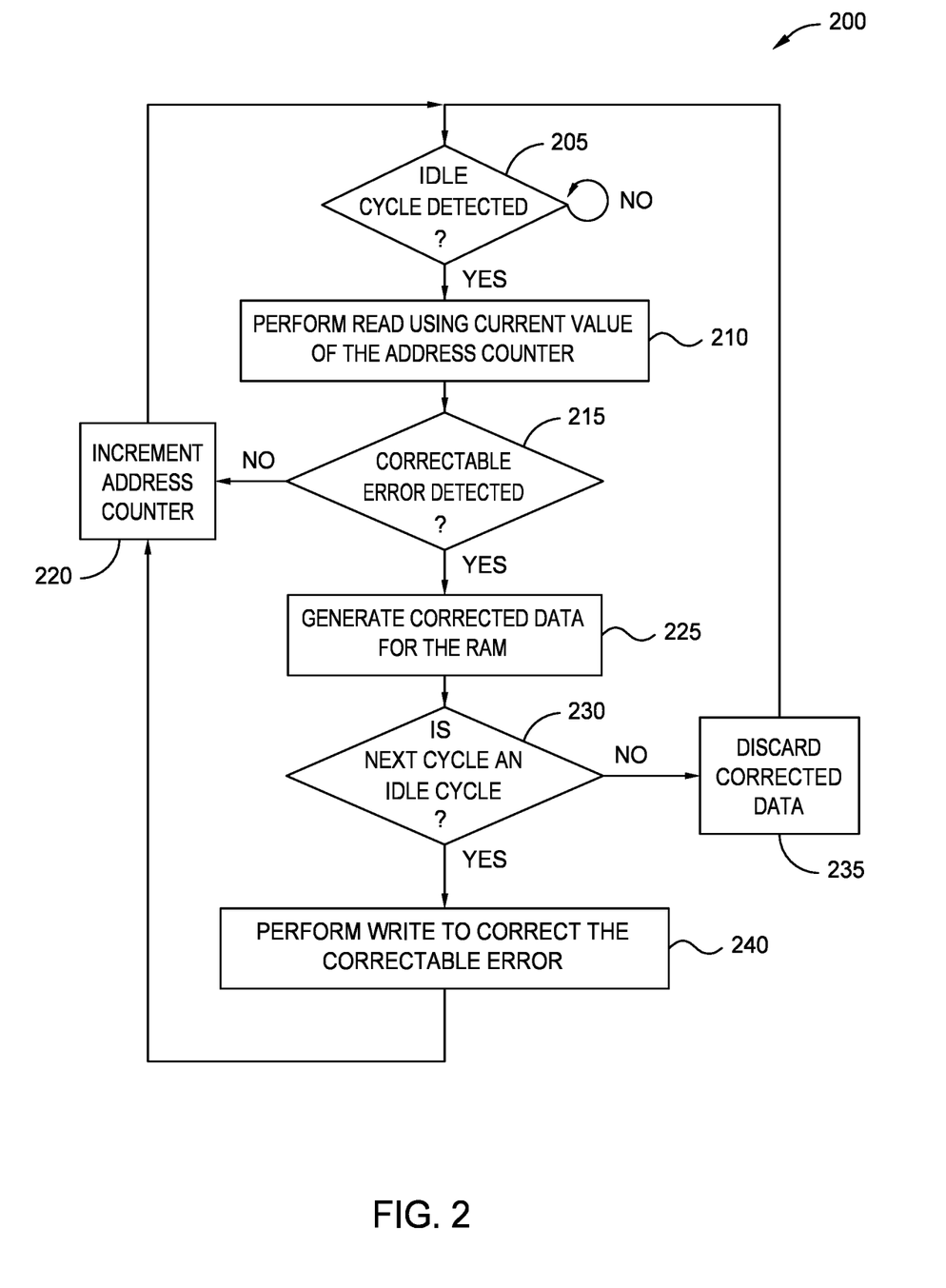
FIG. 2 is a flowchart for correcting errors in a memory, according to an example.

FIG. 2 is a flowchart of a method 200 for correcting errors in a memory, according to an example. When a memory system is powered on, the correction logic in the RAM (e.g., the correction logic 150 in FIG. 1) may have an address counter that starts at the first address in the RAM (e.g., address 0). However, the address counter can be initialized to any default address value.

At block 205, the correction logic determines whether there is an idle cycle where the RAM is currently not being used by a requesting entity (e.g., a memory controller, processor, or application). To do so, the correction logic can monitor read and write enable signals being received at the RAM (e.g., the RENABLE signal 110 and WENABLE signal 115 in FIG. 1). If both of these signals are in a low or inactive state, this indicates the current cycle is an idle cycle.

At block 210, the correction logic performs a read operation using the current value of the address counter. As discussed in FIG. 1, the correctional logic can use its own read enable signal (e.g., READ signal 170) and address bus (e.g., ADDRESS signal 160) to instruct the RAM 105 to perform a read operation. That is, rather than the RAM 105 being unused during the current clock cycle, the correction logic 150 can, in the same cycle it detects the RENABLE and WENABLE signals are inactive, instruct the RAM 105 to perform a read operation at the address current stored in the address counter.

At block 215, the correction logic determines whether there was a correctable error in the data stored at the address of the read operation performed at block 210. For example, the RAM can output the data to an ECC check circuit (e.g., the ECC check 175 in FIG. 1) which determines whether there is no error, a correctable error, or an uncorrectable error in the data using the corresponding ECC bits. The correction logic can monitor the output flags generated by the ECC check circuit. For instance, if the correctable error flag is not set (e.g., the correctable error signal 180 is in a low state), the correction logic can determine there was either no error in the data or there was an uncorrectable error at the location (which must be handled by software and the processor). In either case, if no correctable error is detected, the method 200 proceeds to block 220 where the correction logic increments the address counter to the next address in the RAM and returns to block 205 where the method 200 is repeated for the next address.

If, however, the correction logic does detect a correctable error at the location, the method 200 instead proceeds from block 215 to block 225 where the correction logic generates corrected data (e.g., corrected data 155) to be stored at the current memory address in the RAM. In one embodiment, the ECC check circuit provides one or more corrected bits that would fix the correctable error. The correction logic 150 can combine these corrected bits with the remaining bits (which did not need to be corrected) stored at the location to form the corrected data. Alternatively, the ECC check circuit may provide the corrected data (which includes the corrected bits and the remaining bits) to the correction logic rather than just the bits that need to be corrected. In that case, it is the ECC check circuit that determines the corrected data that should be stored into the RAM rather than the correction logic.

At block 230, the correction logic determines whether the next cycle is an idle cycle. That is, in one embodiment, blocks 205, 210, 215, and 225 may be completed in a single clock cycle (e.g., the time period used by the RAM to perform a single read or write operation). At block 230, the correction logic again monitors the read and write enable signals to ensure that no requesting entity wants to perform a read or write operation using the RAM.

If the correction logic determines the subsequent cycles is not idle, the method 200 proceeds to block 235 where the correction logic discards (or ignores) the corrected data. That is, if the cycle immediately following the cycle in which the correction logic detected a correctable error is also not an idle cycle, the correction logic discards the corrected data. This is because the correction logic may not know whether the requesting entity is going to change the data at the memory address that had the correctable error. For example, the requesting entity may instruct the RAM to write an updated value at the memory address during the cycle. In this embodiment, the correction logic does not check to determine whether the requesting entity is writing or updating the data at the memory location (although in other embodiments discussed later, it can). Instead, the correction logic assumes the worst (i.e., the requesting entity has replaced the data stored at the memory address) and discards the corrected data.

The method 200 then returns to block 205. Notable, the correction logic does not increment the address counter. Thus, the next time there is an idle cycle, the correction logic performs another read at the same memory address to again determine whether it has a correctable error. While this means the correction logic may detect the same correctable error multiple times before it is able to correct the error (i.e., before there are two subsequent idle cycles in the RAM), it also simplifies the design of the correction logic. That is, the correction logic only has to monitor the read and write enable signals to determine whether they are active which only requires a few comparators. To determine whether the requesting entity performed a write to the current address stored in the address counter requires much more circuitry in order to compare multi-bit values (e.g., addresses) to each other. This may slow down the correction logic and make it difficult or impossible to complete its tasks (e.g., detect a correctable error) in a single clock cycle. Thus, the method 200 represents a tradeoff between speed and potentially having to detect the same correctable error multiple times. In this example, the correction logic is designed to be fast as possible so it can easily detect a correctable error within an idle cycle.

Returning to block 230, if the correction logic determines the next cycle is idle, the method 200 proceeds to block 240 where the correction logic performs a write to correct the correctable error. That is, the correction logic transmits the corrected data to replace the corrupted data currently in the RAM. The correction logic also can concurrently activate a write enable signal and transmit the address stored in the address counter to the RAM which causes the RAM to write the corrected data into the appropriate memory location.

Once the correctable error is fixed, the method 200 proceeds to block 220 where the correction logic increments the address counter and the method 200 repeats when the next idle cycle is detected. In this manner, method 200 can be used to detect and correct a correctable error using two subsequent (or back-to-back) idle cycles in the RAM.

Figure 3:
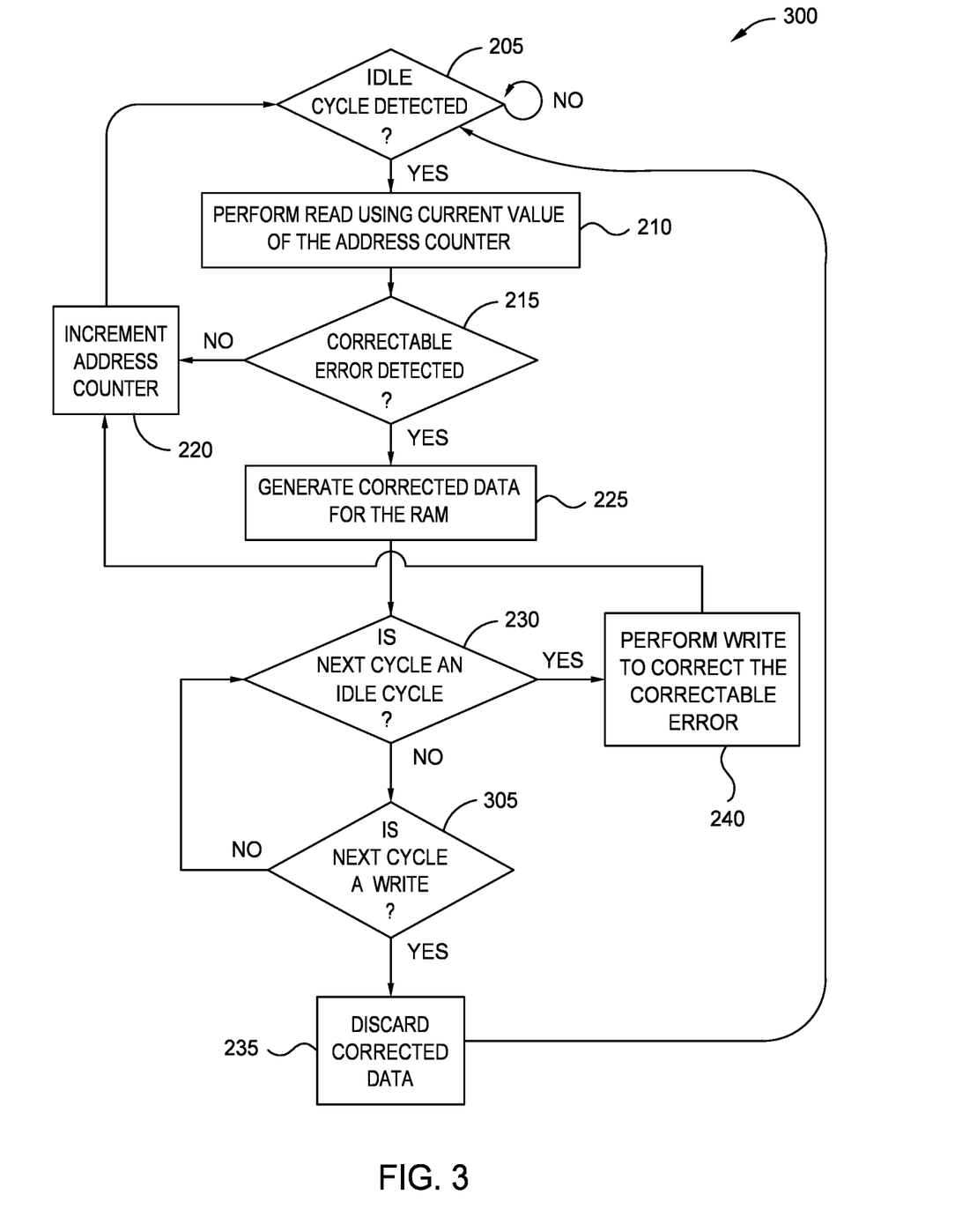
FIG. 3 is a flowchart for correcting errors in a memory, according to an example.

FIG. 3 is a flowchart of method 300 for correcting errors in a memory, according to an example. The method 300 is similar to the method 200 (and similar blocks are labeled using the same reference numbers as those used in method 200). However, the method 300 differs from method 200 in that the correction logic only discards the corrected data when determining the requesting entity is performing a write operation. Otherwise, the correction logic retains the corrected data until it detects another idle cycle where it can replace the corrupted data with the corrected data.

As shown, the method 300 includes blocks 205, 210, 215, 220, 225, 230, and 240, which were described above in method 200, and thus, will not be discussed in detail here. In sum, the correction logic detects an idle cycle, performs a read operation using a current value of the address counter, and if it detects a correctable error at the corresponding memory location, generates corrected data to replace the corrupted data. These actions can be performed in a single clock cycle (although they can be performed using multiple clock cycles).

However, if the correction logic determines at block 230 that the next clock cycle after detecting the correctable error is not an idle cycle, the method proceeds to block 305 where the correction logic determines whether the next cycle is a write. That is, the correction logic determines whether the requesting entity is writing data to the RAM during the cycle by evaluating the write enable signal (e.g., WENABLE in FIG. 1). If not, this means the requesting entity is instead performing a read operation, which in turn means the requesting entity is not going to update the corrupted data that triggered the correctable error. As such, the correction logic does not need to discard the corrected data but can instead retain the data. The correction logic continues to retain the corrected data (even if there are multiple read operations being performed by the requesting entity) in anticipation of eventually detecting an idle cycle.

If the correction logic determines the requesting entity is performing a read operation, the method 300 returns to block 230 where it can determine whether the next cycle is an idle cycle, and if so, at block 240 the correction logic can perform a write operation to fix the correctable error.

However, if at block 305 the correction logic determines the requesting entity is performing a write operation, then the method 300 proceeds to block 235 where the correction logic discards the corrected data and returns to block 205. Like in the method 200, here, since the correction logic does not actively determine whether the requesting entity has overwritten the corrupted data, it assumes the worst case (i.e., that the requesting entity performed a write at the memory location with the corrupted data) and discards the corrected data and waits for another idle cycle to again read the data at the same memory location to determine whether the correctable error is still there.

As such, the method 300 represents a tradeoff between speed and potentially detecting the same correctable error multiple times. In this case, some speed is sacrificed since the correction logic has additional circuitry to specifically determine whether the requesting entity is performing a write versus a read operation during a non-idle cycle. While this requires additional hardware/circuitry in the correction logic, this requires much less hardware than comparing addresses. Thus, while the correction logic that performs method 300 may have more circuitry and take more time to perform its functions than correction logic performing method 200, the method 300 permits the correction logic to retain the corrected data if a requesting entity performs one or more read operations after the correction logic has identified a correctable error. In other words, the correction logic can retain the corrected data so long as the requesting entity does not perform a write operation before the correction logic detects the next idle cycle. This may reduce the number of times the correction logic detects the same correctable error relative to correction logic performing method 200.

Figure 4:
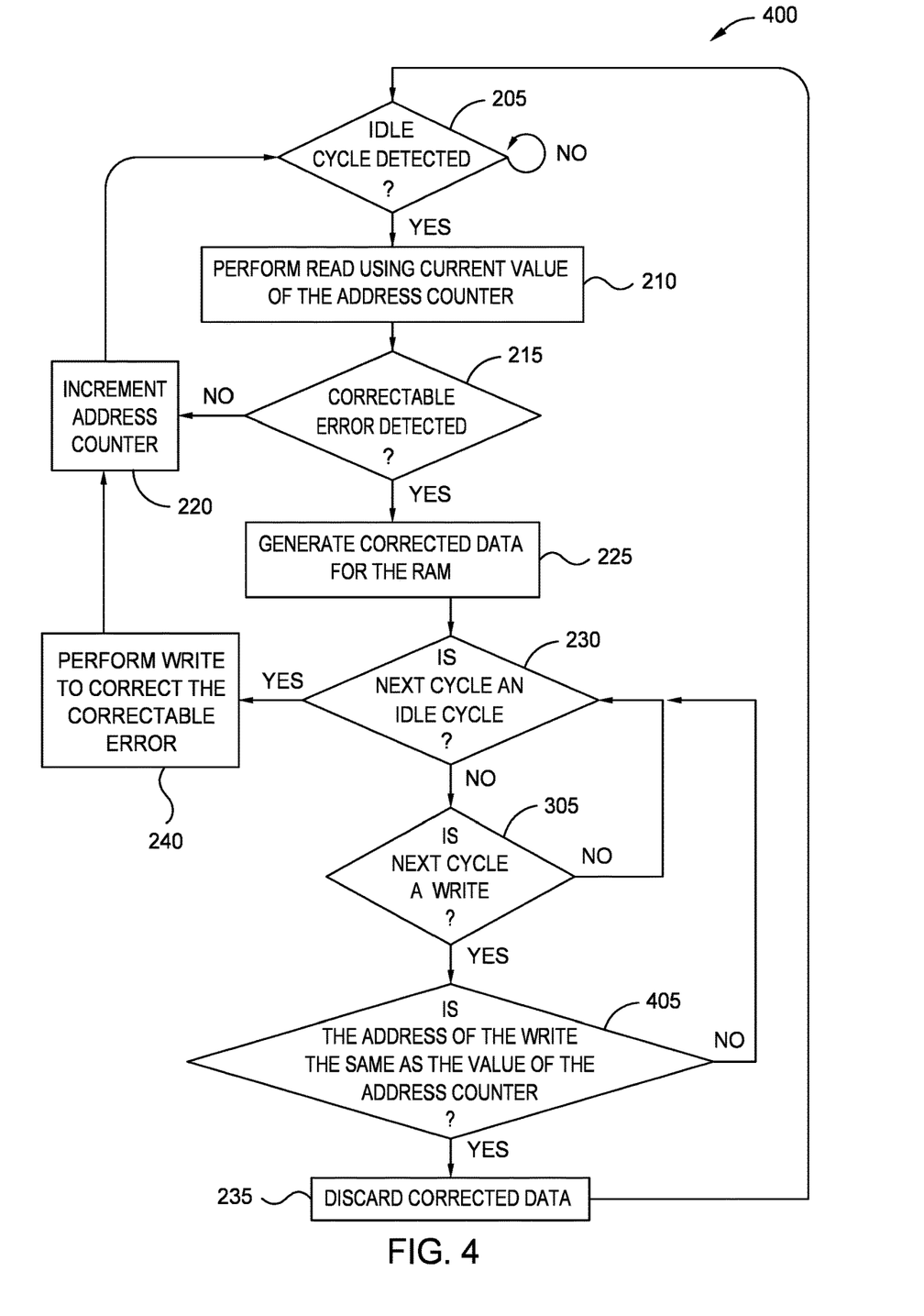
FIG. 4 is a flowchart for correcting errors in a memory, according to an example.

FIG. 4 is a flowchart of a method 400 for correcting errors in a memory, according to an example. The method 400 is similar to the method 200 (and similar blocks are labeled using the same reference numbers as those used in method 200). However, the method 400 differs from method 200 in that the correction logic only discards the corrected data when determining the requesting entity is performing a write operation at the same memory location where the correction logic identifies the correctable error. Otherwise, the correction logic retains the corrected data until it detects another idle cycle where it can replace the corrupted data with the corrected data.

As shown, the method 400 includes blocks 205, 210, 215, 220, 225, 230, and 240, which were described above in method 200, and thus, will not be discussed in detail here. In sum, the correction logic detects an idle cycle, performs a read operation using a current value of the address counter, and if it detects a correctable error at the corresponding memory location, generates corrected data to replace the corrupted data. These actions can be performed in a single clock cycle (although they can be performed using multiple clock cycles).

However, if the correction logic determines at block 230 that the next clock cycle after detecting the correctable error is not an idle cycle, the method proceeds to block 305 where the correction logic determines whether the next cycle is a write. If not (i.e., the requesting entity is performing a read operation), the method 400 returns to block 230 to determine whether the next cycle is an idle cycle.

However, if the requesting entity is performing a write operation at block 305, rather than discarding the data (which was done in the method 300 in FIG. 3), the method 400 proceeds to block 405 where the correction logic determines whether the address of the write is the same as the value of the address counter. Put differently, the correction logic determines whether the requesting entity is writing data in the same location in memory where the correction logic detected the correctable error. If not, the correction logic can continue to retain the corrected data and the method 400 returns to block 230 to determine whether the next cycle is an idle cycle.

However, if the requesting entity is writing to the same memory location that includes the correctable error, then the method 400 proceeds to block 235 where the correction logic discards the corrected data since it is now stale. Put differently, the requesting entity has written new data to the memory location, so the correction logic no longer knows whether that memory location has an error.

While method 400 illustrates proceeding from block 235 to block 205 to re-read the same memory location (i.e., without incrementing the address counter) to determine whether there is a correctable error, in another embodiment, the method may instead proceed to block 220 where the address counter is incremented so the correction logic evaluates data stored in the next memory address during the next idle cycle. That is, the correction logic may not bother to determine whether the data that was just written into the memory location has a correctable error since it was just recently updated by the requesting entity. The odds of that memory location already experiencing a correctable error is very low, and thus, it might be more efficient for the correction logic to instead proceed to the next memory address by incrementing the counter.

Like the methods 200 and 300, the method 400 represents a tradeoff between speed and potentially detecting the same correctable error multiple times. In this case, more speed is sacrificed since the correction logic has additional circuitry to determine whether the requesting entity is performing a write to a specific address (i.e., the same address currently stored in the address counter). Thus, while the correction logic that performs method 400 may have more circuitry and take more time to perform its functions than correction logic performing the methods 200 and 300, the method 300 permits the correction logic to retain the corrected data unless the requesting entity performs a write operation to the same memory address the correction logic identified the correctable error. In other words, the correction logic can fix the correctable error so long as the requesting entity does not perform a write operation to the same memory location before the correction logic detects the next idle cycle. Thus, the method 400 does not detect the same correctable error multiple times, unlike the methods 200 and 300 where this may occur.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
    a memory element configured to store data at a plurality of addressable memory locations; and
    correction logic configured to:
        detect a first idle cycle in the memory element;
        perform a read operation at a first memory address in the memory element during the first idle cycle;
        detect a correctable error at the first memory address;
        detect a second idle cycle in the memory element; and
        perform a write operation at the first memory address during the second idle cycle to correct the correctable error using corrected data.

2. The integrated circuit of claim 1, wherein the second idle cycle directly follows the first idle cycle, wherein the correction logic is configured to discard the corrected data when a cycle immediately following the first idle cycle is not an idle cycle.

3. The integrated circuit of claim 1, wherein the second idle cycle is separated from the first idle cycle by one or more read cycles initiated by a requesting entity separate from the correction logic, wherein the correction logic is configured to discard the corrected data when the requesting entity initiates a write cycle before the correction logic detects another idle cycle after the first idle cycle.

4. The integrated circuit of claim 1, wherein the second idle cycle is separated from the first idle cycle by one or more write cycles to a second memory address initiated by a requesting entity separate from the correction logic, wherein the correction logic is configured to discard the corrected data when the requesting entity initiates a write cycle to the first memory address before the correction logic detects another idle cycle after the first idle cycle.

5. The integrated circuit of claim 1, wherein the first and second idle cycles are clock cycles where the memory element is not being used to perform a read or write operation by a requesting entity separate from the correction logic.

6. The integrated circuit of claim 5, wherein the requesting entity is at least one of a processor or a memory controller.

7. The integrated circuit of claim 1, further comprising:
    an address counter, wherein the first memory address is a current value of the address counter,
    wherein the correction logic is configured to, after performing the write operation at the first memory address, increment the current value of the address counter to store a second memory address in the memory element.

8. The integrated circuit of claim 7, wherein the correction logic is configured to:
    detect a third idle cycle in the memory element;
    perform a read operation at the second memory address in the memory element during the third idle cycle;
    determine there is no correctable error at the second memory address;
    increment the current value of the address counter to store a third memory address in the memory element;
    detect a fourth idle cycle in the memory element; and
    perform a read operation at the third memory address in the memory element during the fourth idle cycle.

9. A circuit comprising:
    a memory element configured to store data at a plurality of addressable memory locations; and
    correction logic configured to:
        detect a first idle cycle in the memory element;
        perform a read operation at a first memory address in the memory element during the first idle cycle;
        detect a correctable error at the first memory address;
        detect a second idle cycle in the memory element; and
        perform a write operation at the first memory address during the second idle cycle to correct the correctable error using corrected data.

10. The circuit of claim 9, wherein the second idle cycle directly follows the first idle cycle, wherein the correction logic is configured to discard the corrected data when a cycle immediately following the first idle cycle is not an idle cycle.

11. The circuit of claim 9, wherein the second idle cycle is separated from the first idle cycle by one or more read cycles initiated by a requesting entity separate from the correction logic, wherein the correction logic is configured to discard the corrected data when the requesting entity initiates a write cycle before the correction logic detects another idle cycle after the first idle cycle.

12. The circuit of claim 9, wherein the second idle cycle is separated from the first idle cycle by one or more write cycles to a second memory address initiated by a requesting entity separate from the correction logic, wherein the correction logic is configured to discard the corrected data when the requesting entity initiates a write cycle to the first memory address before the correction logic detects another idle cycle after the first idle cycle.

13. The circuit of claim 9, wherein the first and second idle cycles are clock cycles where the memory element is not being used to perform a read or write operation by a requesting entity separate from the correction logic.

14. The circuit of claim 9, further comprising:
    an address counter, wherein the first memory address is a current value of the address counter,
    wherein the correction logic is configured to, after performing the write operation at the first memory address, increment the current value of the address counter to store a second memory address in the memory element.

15. The circuit of claim 14, wherein the correction logic is configured to:
    detect a third idle cycle in the memory element;
    perform a read operation at the second memory address in the memory element during the third idle cycle;

determine there is no correctable error at the second memory address;
increment the current value of the address counter to store a third memory address in the memory element;
detect a fourth idle cycle in the memory element; and
perform a read operation at the third memory address in the memory element during the fourth idle cycle.

16. A method, comprising:
detecting a first idle cycle in a memory element comprising a plurality of addressable memory locations;
performing a read operation at a first memory address in the memory element during the first idle cycle;
detecting a correctable error at the first memory address;
detecting a second idle cycle in the memory element; and
performing a write operation at the first memory address during the second idle cycle to correct the correctable error using corrected data.

17. The method of claim 16, wherein detecting the second idle cycle comprises:
determining that the second idle cycle directly follows the first idle cycle, wherein the corrected data is discarded when a cycle immediately following the first idle cycle is not an idle cycle.

18. The method of claim 16, wherein detecting the second idle cycle comprises:
determining that the second idle cycle is separated from the first idle cycle by one or more read cycles initiated by a requesting entity, wherein the corrected data is discarded when the requesting entity initiates a write cycle before another idle cycle is detected after the first idle cycle.

19. The method of claim 16, wherein detecting the second idle cycle comprises:
determining that the second idle cycle is separated from the first idle cycle by one or more write cycles to a second memory address initiated by a requesting entity, wherein the corrected data is discarded when the requesting entity initiates a write cycle to the first memory address before another idle cycle is detected after the first idle cycle.

20. The method of claim 16, further comprising, after performing the write operation at the first memory address:
incrementing a current value of an address counter to store a second memory address in the memory element,
detecting a third idle cycle in the memory element;
performing a read operation at the second memory address in the memory element during the third idle cycle;
determining there is no correctable error at the second memory address;
incrementing the current value of the address counter to store a third memory address in the memory element;
detecting a fourth idle cycle in the memory element; and
performing a read operation at the third memory address in the memory element during the fourth idle cycle.

* * * * *